United States Patent
Kameyama et al.

(10) Patent No.: US 8,018,967 B2
(45) Date of Patent: Sep. 13, 2011

(54) DATA TRANSFER APPARATUS, DATA TRANSFER METHOD AND COMPUTER-READABLE STORAGE MEDIUM STORING A DATA TRANSFER PROGRAM

(75) Inventors: Hiroaki Kameyama, Kawasaki (JP); Akihisa Shouen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 12/493,639

(22) Filed: Jun. 29, 2009

(65) Prior Publication Data
US 2010/0002726 A1   Jan. 7, 2010

(30) Foreign Application Priority Data
Jul. 1, 2008   (JP) .................................. 2008-172626

(51) Int. Cl.
*H04J 3/24* (2006.01)

(52) U.S. Cl. ...................................... 370/474; 375/253
(58) Field of Classification Search .................. 370/412, 370/470–474; 375/240.23–240.27, 246, 375/253
See application file for complete search history.

(56) References Cited

U.S. PATENT DOCUMENTS
| | | | |
|---|---|---|---|
| 6,404,739 | B1 | 6/2002 | Gonno |
| 2007/0047652 | A1* | 3/2007 | Maruyama et al. ...... 375/240.16 |
| 2009/0259915 | A1* | 10/2009 | Livshitz et al. ............... 714/758 |

FOREIGN PATENT DOCUMENTS
| | | |
|---|---|---|
| JP | 10-656675 | 3/1998 |
| JP | 10-285205 | 10/1998 |
| JP | 11-17737 | 1/1999 |
| JP | 2007-274309 | 10/2007 |

* cited by examiner

*Primary Examiner* — Pao Sinkantarakorn
*Assistant Examiner* — Kan Yuen
(74) *Attorney, Agent, or Firm* — Fujitsu Patent Center

(57) ABSTRACT

A data transfer apparatus includes a data accumulation unit to accumulate data to be transferred, an encoding matrix storage unit to store an encoding matrix for encoding data of each of a plurality of data sizes, an encoding size determination unit to determine a block of data to be transmitted in descending order of data size based on the data sizes of the data accumulated in the encoding matrix storage unit, an encoding unit to acquire an encoding matrix corresponding to the data size of the determined block form the encoding size determination unit and encode data accumulated in the data accumulation unit for each block using the acquired encoding matrix, a packet generation unit to generate a packet by adding encoding information about the encoding matrix used for encoding the encoded data, and a transmission unit to transmit the generated packet.

17 Claims, 20 Drawing Sheets

FIG. 18

(6) MAKING UNIT MATRIX

CONDITION OF DECODED STACK

| 1 | 1 | 0 | 0 | A ⊕ B |
|---|---|---|---|-------|
| 0 | 1 | 0 | 1 | B ⊕ D |
| 0 | 0 | 1 | 0 | C |
| 0 | 0 | 0 | 1 | D |

~122

XOR, XOR

| 1 | 0 | 0 | 0 | A |
|---|---|---|---|---|
| 0 | 1 | 0 | 0 | B |
| 0 | 0 | 1 | 0 | C |
| 0 | 0 | 0 | 1 | D |

~122

TRANSMISSION DATA

STRUCTURE OF ACK

DATA TRANSFER APPARATUS, DATA TRANSFER METHOD AND COMPUTER-READABLE STORAGE MEDIUM STORING A DATA TRANSFER PROGRAM

CROSS-REFERENCE TO RELATED APPLICATIONS

This application is based upon and claims the benefit of priority of the prior Japanese Patent Application No. 2008-172626, filed on Jul. 1, 2008, the entire contents of which are incorporated herein by reference.

BACKGROUND

In recent years, data such as images and video is increasingly transferred via a network such as an IP network. For example, an ASP (Active Server Pages) system that operates a server screen from a client at a remote location via a network transfers image data via the network.

When data is transferred via a network, related technologies such as data compression, data encoding, data decoding, and retransmission are generally used. These related technologies are disclosed, for example, in Japanese Unexamined Patent Application Nos. 10-285205, 2007-274309, 10-65675, and 11-17737.

SUMMARY

An example of an embodiment of the present invention provides a data transfer apparatus. The data transfer apparatus includes a data accumulation unit to accumulate data to be transferred, an encoding matrix storage unit to store an encoding matrix for encoding data of each of a plurality of data sizes, an encoding size determination unit to determine a block of data to be transmitted in descending order of data size based on the data sizes of the data accumulated in the encoding matrix storage unit, an encoding unit to acquire an encoding matrix corresponding to the data size of the determined block form the encoding size determination unit and encode data accumulated in the data accumulation unit for each block using the acquired encoding matrix, a packet generation unit to generate a packet by adding encoding information about the encoding matrix used for encoding the encoded data, and a transmission unit to transmit the generated packet.

It is to be understood that both the foregoing summary description and the following detailed description are explanatory as to some embodiments of the present invention, and not restrictive of the present invention as claimed.

BRIEF DESCRIPTION OF DRAWINGS

FIG. 18 is an image diagram of an example of an embodiment of decoding processing;

DESCRIPTION OF EXAMPLES OF EMBODIMENTS

In data transfer in an IP network, for example, highly reliable TCP (Transmission Control Protocol) with functions such as retransmission of a defective portion is frequently used. However, the transfer rate of data transfer using TCP is relatively slow due to overheads such as response processing, for example. Particularly, with an increasing value of RTT (Round-Trip Time) representing a distance between networks, data transfer using TCP (Transmission Control Protocol) becomes slower and a real-time nature of the transfer deteriorates.

In contrast, in data transfer such as sound streaming in which lower reliability poses no problem, the real-time nature is enhanced by using UDPTCK (User Datagram Protocol) resistant to an influence of RTT.

An ASP system may desire a real-time nature of transfer, however, TCP is used in an ASP system because if reliability is low, communication results (screen) will change. Therefore, an ASP system is subject to RTT and the real-time nature of the transfer tends to deteriorate.

As a method of addressing and/or solving issues relating to a lower real-time nature of transfer, a technique of using UDP for data transfer and to correct a defective portion if data becomes defective may be implemented to increase reliability by making data redundant before the data is transferred is known. A certain data size is used to encode data. A technique using UDP for data transfer and to correct a defective portion if data becomes defective to increase reliability by making data redundant before the data being transferred generally poses no problem in a system in which a fixed amount of data constantly flows. However, the technique using UDP for data transfer and to correct a defective portion if data becomes defective to increase reliability by making data redundant before the data is transferred causes a wait time until a fixed data size to encode data is reached in a system such as an ASP system in which the amount of data flowing changes over time.

An example of an embodiment to address and/or solve the above issues will be described below with reference to drawings. An ASP system as a data transfer system that transfers data according to an example of an embodiment is described below.

Figure 1:
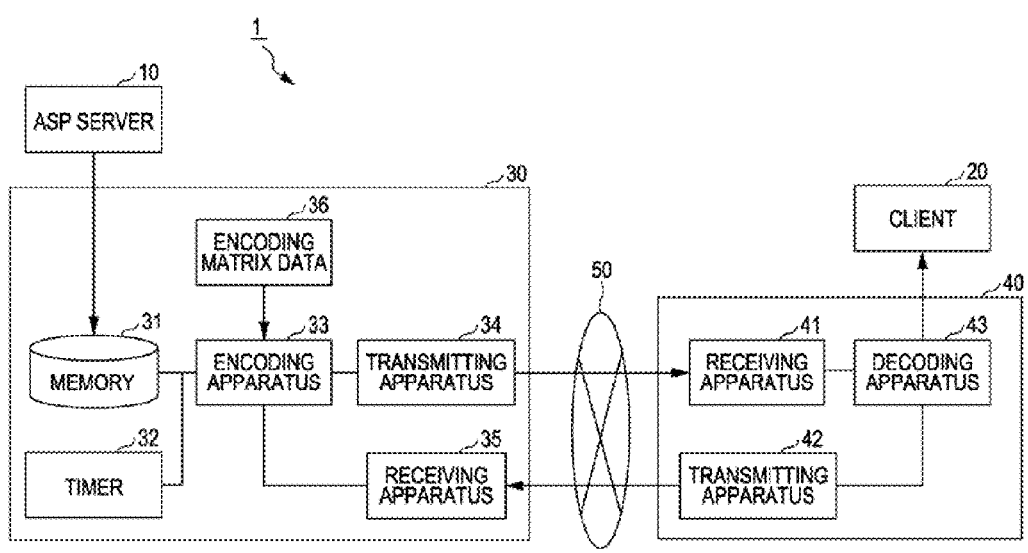
FIG. 1 is a schematic diagram of an example of an embodiment of an ASP system.

FIG. 1 is a schematic diagram of an ASP system. In FIG. 1, the ASP system 1 includes an ASP server 10, a client 20, a data transfer apparatus 30, a data receiving apparatus 40, and a network 50. The ASP system 1 operates the screen of the ASP server 10 from the client 20 at a remote location via the network 50.

The ASP server 10 transfers screen data to the client 20 via the data transfer apparatus 30, the data receiving apparatus 40, and the network 50. The screen data transferred from the ASP server 10 to the client 20 generally does not have constant data size to be transferred when viewed in unit times. Rather, the screen data to be transferred generally varies greatly in data size. When the data transfer apparatus 30 transfers screen data, as described below, the data transfer apparatus 30 takes measures against data losses and performs data encoding for speed-up while not losing the real-time nature.

Referring to FIG. 1, the data transfer apparatus 30 includes a memory 31, a timer 32, an encoding apparatus 33, a transmitting apparatus 34, a receiving apparatus 35, and an encoding matrix 36. The data receiving apparatus 40 includes a receiving apparatus 41, a transmitting apparatus 42, and a decoding apparatus 43. The ASP server 10 sequentially accumulates screen data (hereinafter, referred to simply as data) to be transferred to the client 20 in the memory 31.

The data transfer apparatus 30 transfers, as described below, data accumulated in the memory 31 to the data receiving apparatus 40. The data receiving apparatus 40 transfers, as described below, the data transferred from the data transfer apparatus 30 to the client 20. Details of the data transfer apparatus 30 and the data receiving apparatus 40 will be described below.

Figure 2:
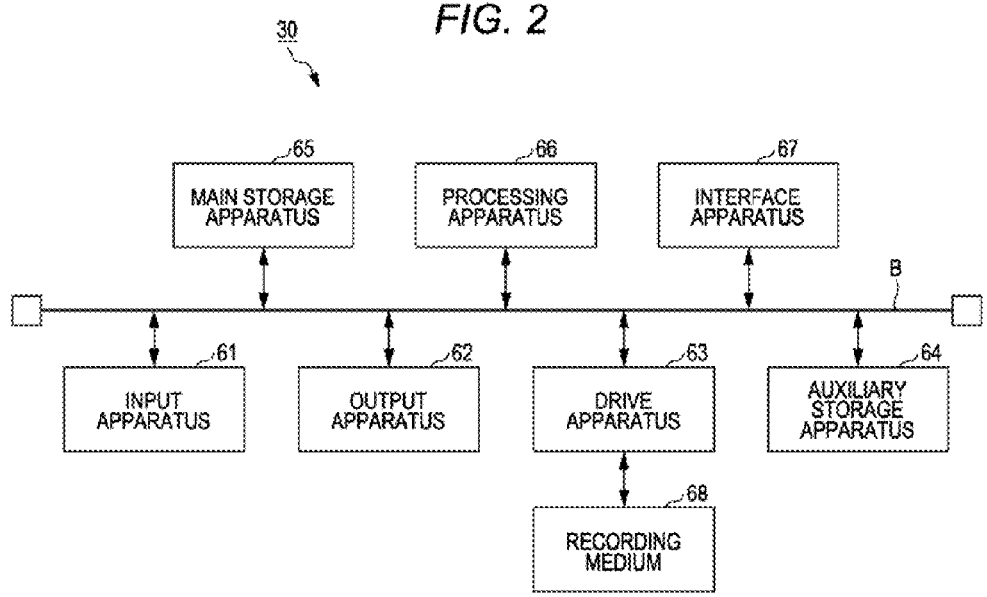
FIG. 2 is a schematic diagram of hardware of an example of an embodiment of a data transfer apparatus.

FIG. 2 is a schematic diagram of hardware of a data transfer apparatus. The data transfer apparatus 30 in FIG. 2 shows an example in which the data transfer apparatus 30 is implemented by a computer when the computer executes a data transfer program stored on a computer-readable storage medium.

The data transfer apparatus 30 includes an input apparatus 61, an output apparatus 62, a drive apparatus 63, an auxiliary storage apparatus 64, a main storage apparatus 65, a processing apparatus 66, and an interface apparatus 67 that are mutually connected by a bus B. The data transfer apparatus 30 may not include the input apparatus 61 or the output apparatus 62 or both.

The input apparatus 61 may include a keyboard, a mouse or the like and is used to input various kinds of signals. The output apparatus 62 may include a display apparatus or the like and is used to display various windows, data and the like. The interface apparatus 67 may include a modem, router, LAN card or the like and is used to connect to the network 50.

A data transfer program is at least a portion of various programs that control the data transfer apparatus 30. The data transfer program may be stored on the recording medium 68 being distributed or downloaded from the network 50 and stored on a computer-readable storage medium such as the recording medium 68. The recording medium 68 which records a data transfer program can be various types of recording medium. For example, the recording medium 68 may be a recording medium which optically, electronically or magnetically records information such as CD-ROM, flexible disk and magneto-optical disk. Alternatively, the recording medium may be a recording medium which electronically records information such as a semiconductor memory, for example, ROM and flash memory.

When the recording medium 68 in which a data transfer program is recorded is sent to the drive apparatus 63, the data transfer program may be installed in the auxiliary storage apparatus 64 from the recording medium 68 via the drive apparatus 63. Further, a data transfer program downloaded from the network 50 may installed in the auxiliary storage apparatus 64 via the interface apparatus 67.

The auxiliary storage apparatus 64 stores the installed data transfer program and also files, data and the like used by the data transfer program and/or used for executing the data transfer program. The main storage apparatus 65 reads the data transfer program from the auxiliary storage apparatus 64 and stores the data transfer program therein when a computer is started or the like. The processing apparatus 66 implements various kinds of processing described below according to the data transfer program stored in the main storage apparatus 65.

Figure 3:
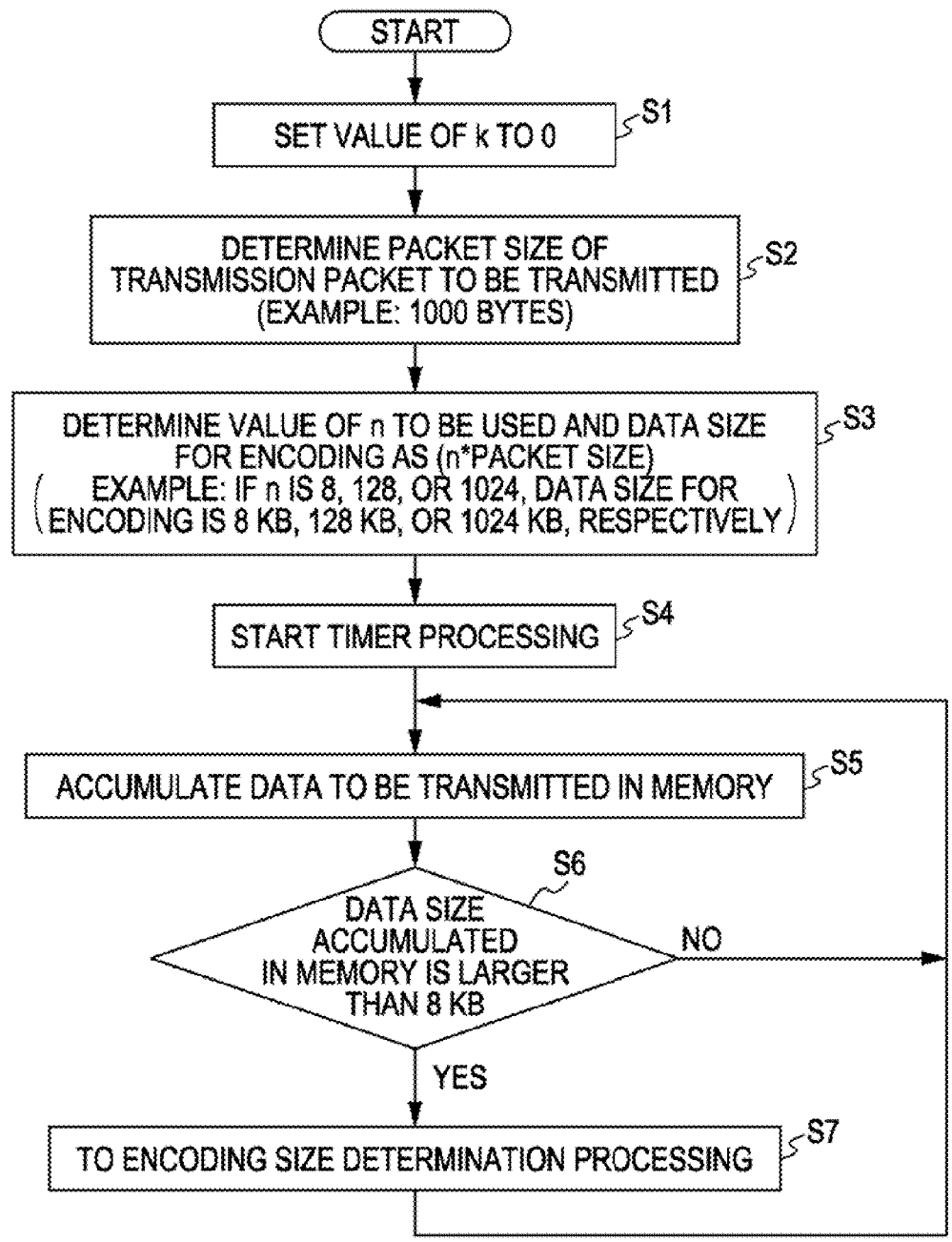
FIG. 3 is a flow chart showing an example of an embodiment of a main processing procedure of the data transfer apparatus.

FIG. 3 is a flow chart showing a main processing procedure of the data transfer apparatus. When the data transfer apparatus 30 is started, for example, the main processing procedure shown in the flow chart in FIG. 3 is started.

Processing proceeds to S1 and the coding apparatus 33 sets the value of "k" to 0. Processing proceeds to S2 and the coding apparatus 33 determines the packet size (for example, 1000 bytes) of a transmission packet. The packet size represents not the data size of the transmission packet, but the data size of a transmission data portion of the transmission packet (encoding unit: data size of sub-data).

Processing proceeds to S3 and the coding apparatus 33 determines a plurality of values of "n" to be used (for example, n=8, 128, and 1024). The coding apparatus 33 determines the data size (block data size) used and/or needed for encoding as "n*packet size". If, for example, values of n are 8, 128, and 1024, block data sizes for encoding will be 8 KB, 128 KB, and 1024 KB, respectively. An example in which block data sizes for encoding are 8 KB, 128 KB, and 1024 KB will be described below.

Processing proceeds to S4 and the coding apparatus 33 causes the timer 32 to start timer processing described below. Processing proceeds to S5 and data to be transferred to the client 20 is sequentially accumulated in the memory 31 by the ASP server 10. Processing proceeds to S6 and the coding apparatus 33 determines whether the data size of data accumulated in the memory 31 is larger than the smallest data size (e.g., 8 KB) of block data sizes determined at S3.

If the coding apparatus 33 determines that the data size of data accumulated in the memory 31 is larger than the smallest data size of block data sizes determined at S3, the coding apparatus 33 proceeds to S7 and performs coding size determination processing described below before returning to S5.

If the coding apparatus 33 determines that the data size of data accumulated in the memory 31 is not larger than the smallest data size of block data sizes determined at S3, the coding apparatus 33 returns processing at S5.

Figure 4:
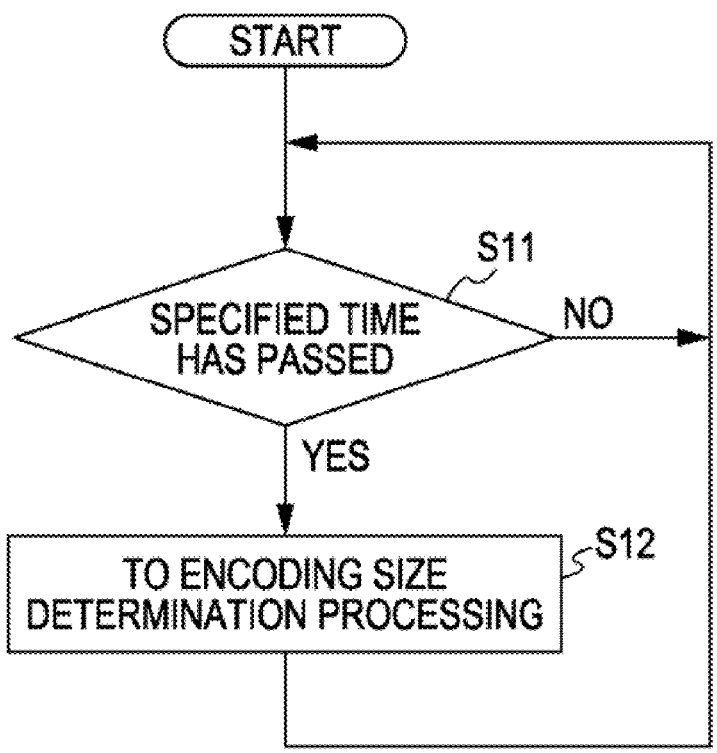
FIG. 4 is a flow chart showing an example of an embodiment of a timer processing procedure.
Figure 5:
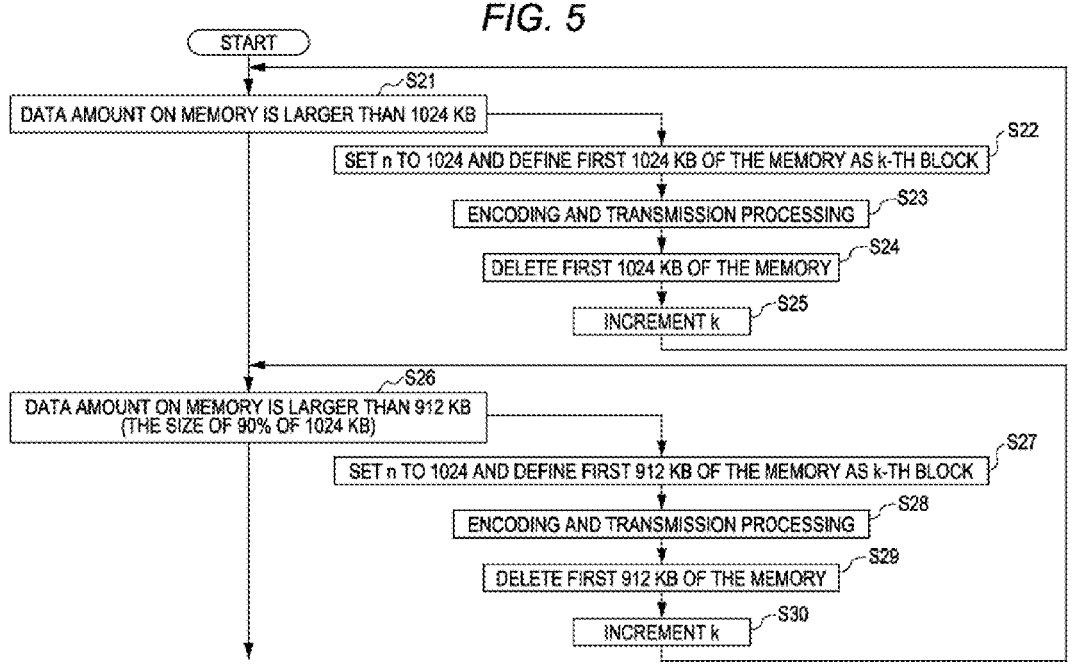
FIG. 5 is a flow chart showing an example of an embodiment of a coding size determination processing procedure.
Figure 6:
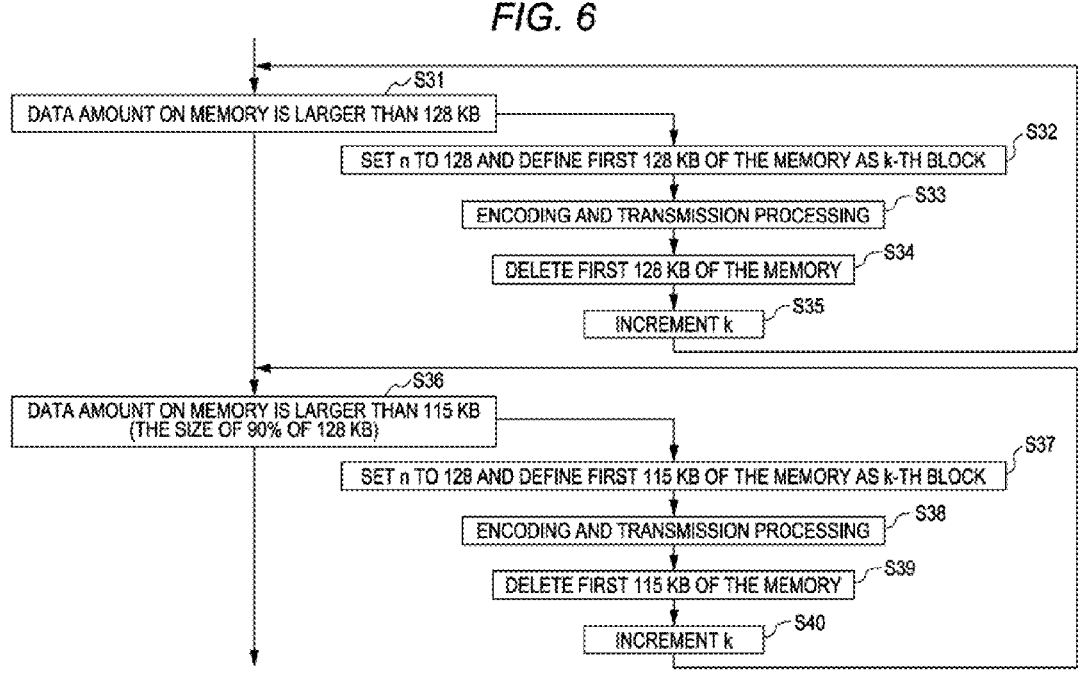
FIG. 6 is a flow chart showing an example of an embodiment of a coding size determination processing procedure.
Figure 7:
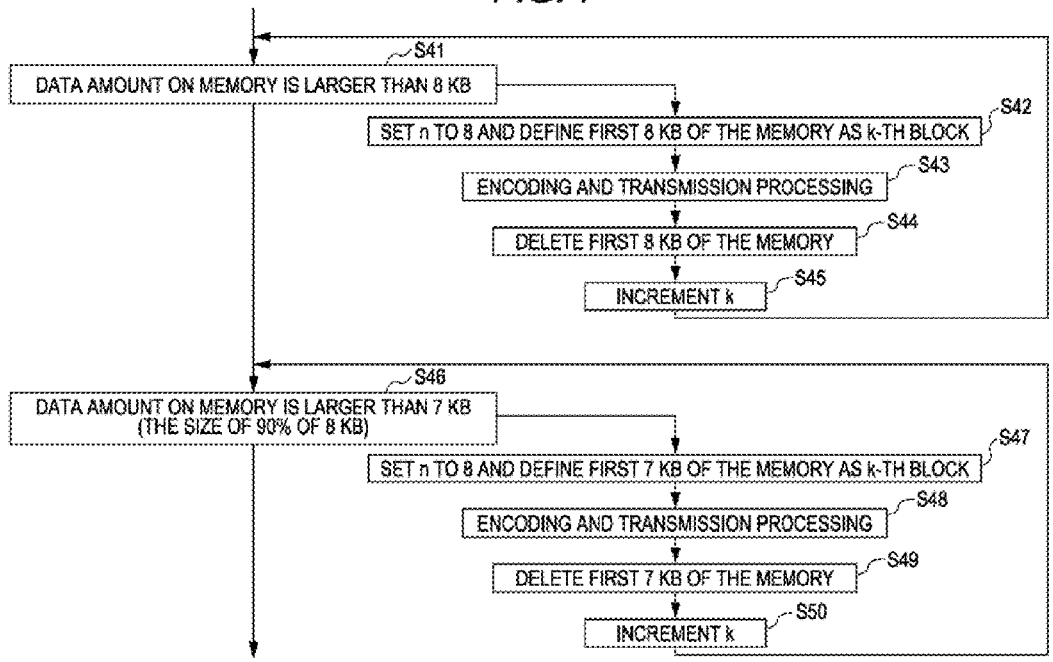
FIG. 7 is a flow chart showing an example of an embodiment of a coding size determination processing procedure.
Figure 8:
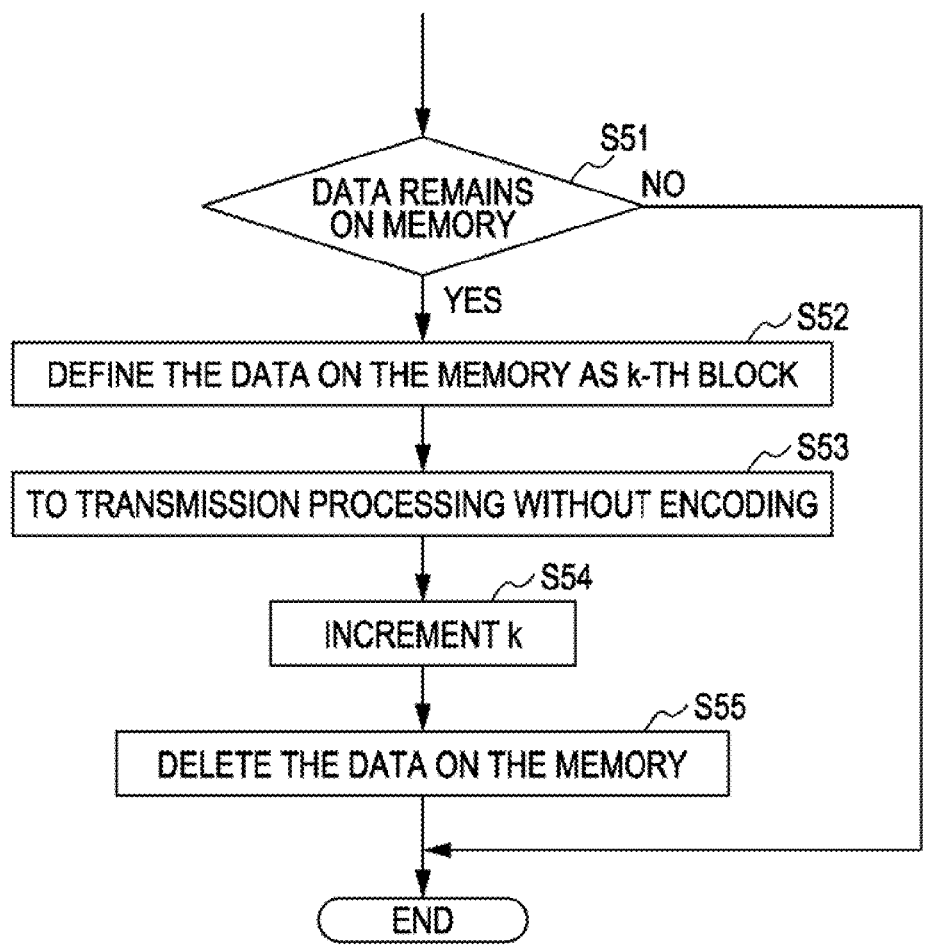
FIG. 8 is a flow chart showing an example of an embodiment of a coding size determination processing procedure.

FIG. 4 is a flow chart showing a timer processing procedure. The timer 32 keeps time (non-transmission time) passed after the last transmission packet is transmitted or the data transfer apparatus 30 is turned on. Processing proceeds to S11 and the timer 32 determines whether a specified time has passed after the last transmission packet is transmitted or the data transfer apparatus 30 is turned on.

If the specified time has not passed after the last transmission packet is transmitted or the data transfer apparatus 30 is turned on, the timer 32 returns to processing at S11. If the specified time has passed after the last transmission packet is transmitted or the data transfer apparatus 30 is turned on, the timer 32 proceeds to S12 and instructs the coding apparatus 33 to perform coding size determination processing described below before returning to S11.

FIG. 5 to FIG. 8 are flow charts showing a coding size determination processing procedure. The coding apparatus 33 proceeds to S22 and determines whether the data amount (data size) of data accumulated in the memory 31 is larger than the largest data size (e.g., 1024 KB) of the block data sizes determined at S3.

If the data amount of data accumulated in the memory 31 is larger than 1024 KB, the coding apparatus 33 proceeds to S22, sets the value of "n" to 1024, and defines 1024 KB from the head of data accumulated in the memory 31 as the "k"-th block.

Processing proceeds to S23 and the coding apparatus 33 performs encoding and transmission processing of the "k"-th block as described below. Processing proceeds to S24 and the coding apparatus 33 deletes 1024 KB from the head of data accumulated in the memory 31. That is, data defined as the "k"-th block is deleted from the memory 31. Processing proceeds to S25 and the coding apparatus 33 increments the value of "k" before returning to processing at S21.

If, on the other hand, the data amount of data accumulated in the memory 31 is not larger than 1024 KB, the coding apparatus 33 proceeds to S26 and determines whether the data amount of data accumulated in the memory 31 is larger than 912 KB (data size corresponding to 90% of 1024 KB). The 912 KB is a reduced data size, which corresponds to 90% of 1024 KB, and may be obtained by multiplying a ratio with the data size of the block of data with the data size of 912 KB.

If the data amount of data accumulated in the memory 31 is larger than 912 KB, the coding apparatus 33 proceeds to S27, sets the value of "n" to 1024, and defines 912 KB from the head of data accumulated in the memory 31 as the "k"-th block.

Processing proceeds to S28 and the coding apparatus 33 performs encoding and transmission processing of the "k"-th block as described below. Processing proceeds to S29 and the coding apparatus 33 deletes 912 KB from the head of data accumulated in the memory 31. That is, data defined as the "k"-th block is deleted from the memory 31. Processing proceeds to S30 and the coding apparatus 33 increments the value of "k" before returning to processing at S26.

If, on the other hand, the data amount of data accumulated in the memory 31 is not larger than 912 KB, the coding apparatus 33 proceeds to S31 and determines whether the data amount of data accumulated in the memory 31 is larger than the second largest data size (e.g., 128 KB).

If the data amount of data accumulated in the memory 31 is larger than 128 KB, the coding apparatus 33 proceeds to S32, sets the value of "n" to 128, and defines 128 KB from the head of data accumulated in the memory 31 as the "k"-th block.

Processing proceeds to S33 and the coding apparatus 33 performs encoding and transmission processing of the "k"-th block as described below. Processing proceeds to S34 and the coding apparatus 33 deletes 128 KB from the head of data accumulated in the memory 31. That is, data defined as the "k"-th block is deleted from the memory 31. Processing proceeds to S35 and the coding apparatus 33 increments the value of "k" before returning to processing at S31.

If, on the other hand, the data amount of data accumulated in the memory 31 is not larger than 128 KB, the coding apparatus 33 proceeds to S36 and determines whether the data amount of data accumulated in the memory 31 is larger than 115 KB (e.g., data size corresponding to 90% of 128 KB). The 115 KB is a reduced data size, which corresponds to 90% of 128 KB, and may be obtained by multiplying a ratio with the data size of the block of data with the data size of 128 KB.

If the data amount of data accumulated in the memory 31 is larger than 115 KB, the coding apparatus 33 proceeds to S37, sets the value of "n" to 128, and defines 115 KB from the head of data accumulated in the memory 31 as the "k"-th block.

Processing proceeds to S38 and the coding apparatus 33 performs encoding and transmission processing of the "k"-th block as described below. Processing proceeds to S39 and the coding apparatus 33 deletes 115 KB from the head of data accumulated in the memory 31. That is, data defined as the "k"-th block is deleted from the memory 31. Processing proceeds to S40 and the coding apparatus 33 increments the value of "k" before returning to processing at S36.

If, on the other hand, the data amount of data accumulated in the memory 31 is not larger than 115 KB, the coding apparatus 33 proceeds to S41 and determines whether the data amount of data accumulated in the memory 31 is larger than the third largest data size (e.g., 8 KB) of the block data sizes determined at S3. If the data amount of data accumulated in the memory 31 is larger than 8 KB, the coding apparatus 33 proceeds to S42, sets the value of "n" to 8, and defines 8 KB from the head of data accumulated in the memory 31 as the "k"-th block.

Processing proceeds to S43 and the coding apparatus 33 performs encoding and transmission processing of the "k"-th block as described below. Processing proceeds to S44 and the coding apparatus 33 deletes 8 KB from the head of data accumulated in the memory 31. That is, data defined as the "k"-th block is deleted from the memory 31. Processing proceeds to S45 and the coding apparatus 33 increments the value of "k" before returning to processing at S41.

If, on the other hand, the data amount of data accumulated in the memory 31 is not larger than 8 KB, the coding apparatus 33 proceeds to S46 and determines whether the data amount of data accumulated in the memory 31 is larger than 7 KB (data size corresponding to 90% of 8 KB). The 7 KB is a reduced data size, which corresponds to 90% of 8 KB, and may be obtained by multiplying a ratio with the data size of the block of data with the data size of 8 KB. If the data amount of data accumulated in the memory 31 is larger than 7 KB, the coding apparatus 33 proceeds to S47, sets the value of "n" to 8 and, defines 7 KB from the head of data accumulated in the memory 31 as the "k"-th block.

Processing proceeds to S48 and the coding apparatus 33 performs encoding and transmission processing of the "k"-th block as described below. Processing proceeds to S49 and the coding apparatus 33 deletes 7 KB from the head of data accumulated in the memory 31. That is, data defined as the "k"-th block is deleted from the memory 31. Processing proceeds to S50 and the coding apparatus 33 increments the value of "k" before returning to processing at S46.

If, on the other hand, the data amount of data accumulated in the memory 31 is not larger than 7 KB, the coding apparatus 33 proceeds to S51 and determines whether data remains in the memory 31. If data remains in the memory 31, the coding apparatus 33 proceeds to S52 and defines the data remaining in the memory 31 as the "k"-th block.

Processing proceeds to S53 and the coding apparatus 33 performs transmission processing as described below without encoding. Processing proceeds to S54 and the coding apparatus 33 increments the value of "k". Then, processing proceeds to S55 and the coding apparatus 33 deletes data remaining in the memory 31. That is, after deleting data remaining in the memory 31 defined as the "k"-th block from the memory 31, the coding apparatus 33 terminates coding size determination processing. If no data remains in the memory 31 at S51, the coding apparatus 33 directly terminates coding size determination processing.

Figure 9:
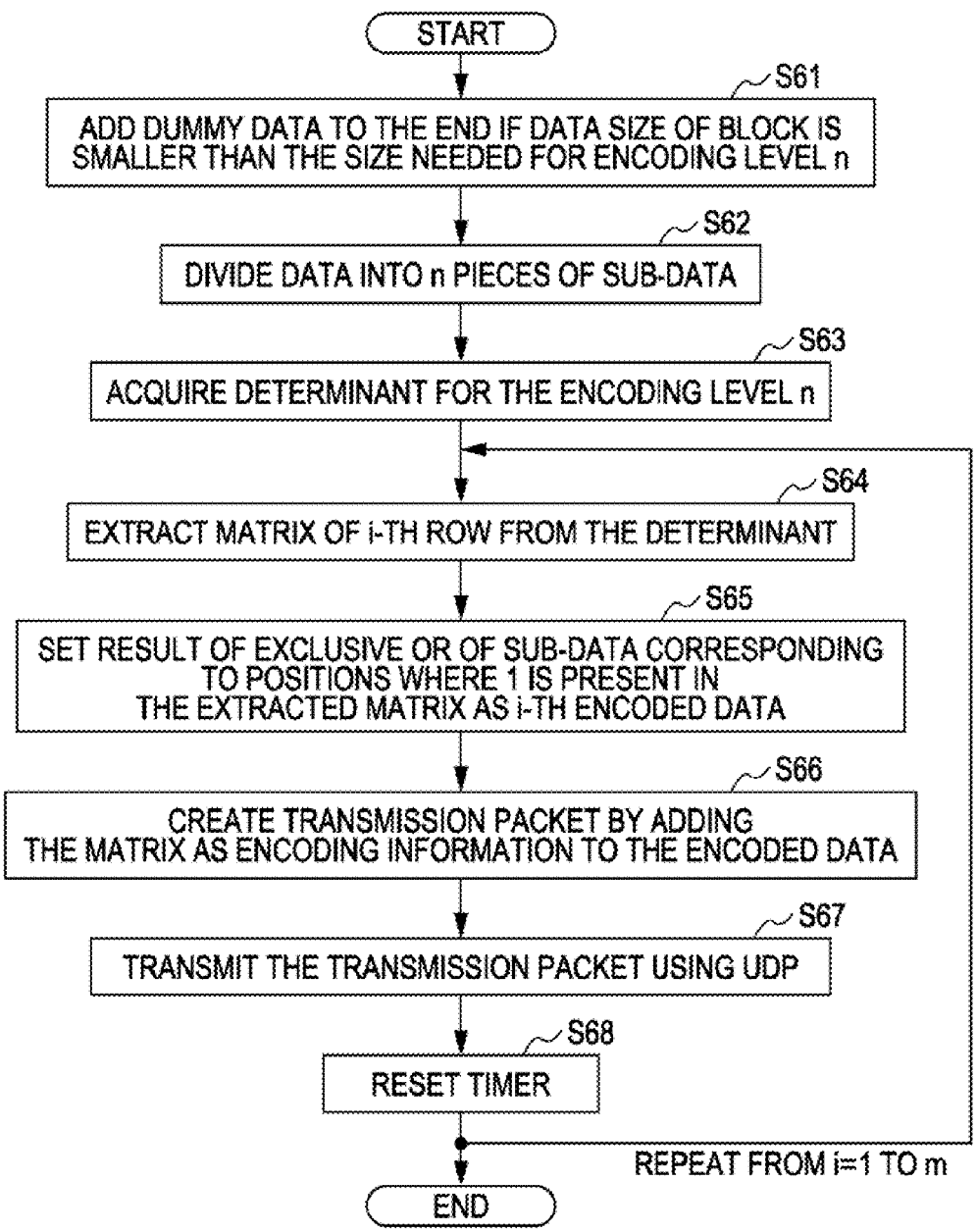
FIG. 9 is a flow chart showing an example of procedures for block encoding and transmission processing.

FIG. 9 is a flow chart showing procedures for block encoding and transmission processing. In FIG. 9, the value of "n" is called the coding level. Processing proceeds to S61 and the coding apparatus 33 adds dummy data to the end of a block if the data size of the block is smaller than the data size (e.g., 1024 KB, 128 KB, or 8 KB) used for the coding level n (e.g., 1024, 128, or 8).

In the coding size determination processing in FIG. 5 to FIG. 8, for example, processing at S61 adds dummy data to a data block of 912 KB, 115 KB, or 7 KB, which are 90% of the data size of 1024 KB, 128 KB, or 8 KB, respectively, to make a block of 1024 KB, 128 KB, or 8 KB.

Processing proceeds to S62 and the coding apparatus 33 divides the data block of the coding level n (e.g., 1024, 128, or 8) into n (e.g., 1024, 128, or 8) pieces of sub-data. The data size of each piece of sub-data has the packet size described above.

Processing proceeds to S63 and the coding apparatus 33 acquires a determinant of the coding level n (encoding matrix 36). Here, the determinant of the coding level n is assumed to be an "n×m" determinant for the description below.

Processing proceeds to S64 and the coding apparatus 33 extracts a matrix of the i-th row from the determinant acquired at S63. The initial value of "i" is assumed to be "1". If, for example, the coding level n is "8", the matrix extracted at S64 includes eight components. Each component has the value of "0" or "1", and each component is associated with sub-data. The matrix extracted at S64 represents a calculation of an exclusive logical sum of sub-data corresponding to each component having the value "1.

Processing proceeds to S65 and the coding apparatus 33 calculates an exclusive logical sum of sub-data corresponding to each component having the value "1" of the matrix extracted at S64 and sets the exclusive logical sum as an i-th piece of encoded data.

Figure 10:
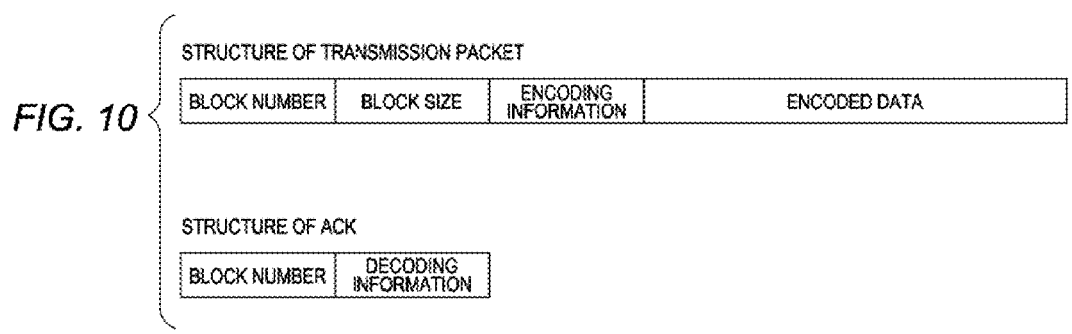
FIG. 10 is a schematic diagram of an example of an embodiment of a transmission packet.

Processing proceeds to S66 and the coding apparatus 33 creates a transmission packet by adding the matrix extracted at S64 as encoding information to the i-th piece of encoded data. FIG. 10 is a schematic diagram of a transmission packet. The transmission packet shown in FIG. 10 is configured to have a block number, block size, encoding information, and decoded data.

The block number is the value of "k". The block size is a data size of data obtained by subtracting dummy data from encoded data. The encoding information is the matrix extracted at S64. The encoded data may be calculated as an exclusive logical sum of sub-data corresponding to each component having the value "1" of the matrix extracted at S64.

Processing proceeds to S67 and the coding apparatus 33 causes the transmitting apparatus 34 to transmit the transmission packet using UDP. Processing proceeds to S68 and the coding apparatus 33 resets the timer 32 before returning to S64. The value of "i" is incremented each time processing at S64 to S68 is performed. Processing at S64 to S68 is repeated until the value of "i" becomes "m".

Figure 11:
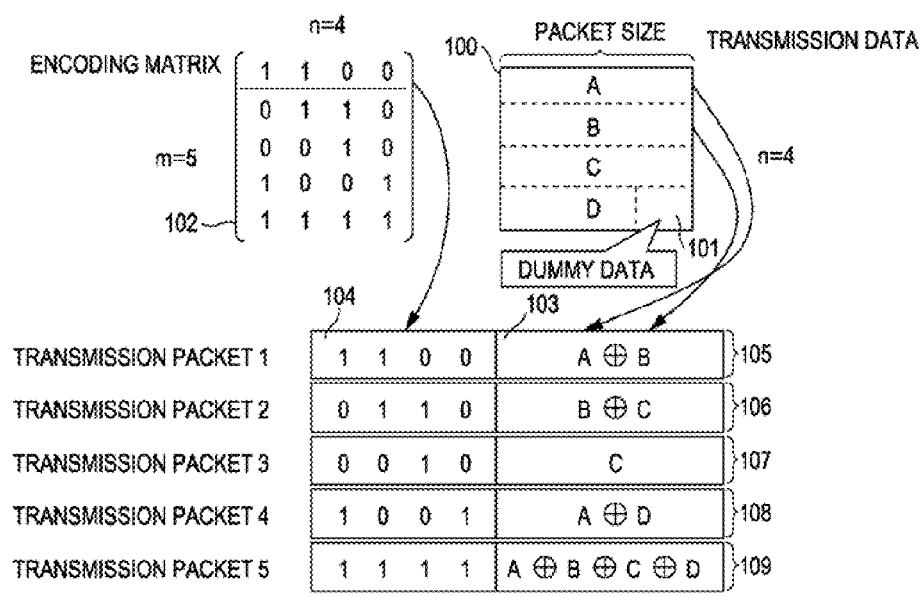
FIG. 11 is an image diagram of an example of an embodiment of a block encoding and transmission processing.

Here, block encoding and transmission processing shown in FIG. 9 will be described with reference to FIG. 11. FIG. 11 is an image diagram of block encoding and transmission processing. To make the description of FIG. 11 easier, FIG. 11 shows an example in which the coding level n is "4".

If the data size of a block 100 is smaller than the data size 4 KB needed for the coding level n=4, the coding apparatus 33 adds dummy data 101 to the end of the block 100 to create the block 100 of 4 KB. The coding apparatus 33 divides the data block of the coding level n=4 into four pieces of sub-data A to D (n=4). The data size of each piece of the sub-data A to D becomes the above packet size.

The coding apparatus 33 acquires a matrix 102 of the coding level n=4. Here, the matrix of the coding level n=4 is assumed to be the "4×5" matrix 102. The coding apparatus 33 extracts the matrix "1100" in the first row from the acquired matrix 102. Each component of a row of the matrix 102 is associated with the sub-data A to D from the left one by one.

The matrix "1100" in the first row represents a calculation of an exclusive logical sum of the sub-data A and B corresponding to each component having the value "1". The coding apparatus 33 creates a transmission packet 105 in such a way that encoded data 103, which is a calculated exclusive logical sum of the sub-data A and B, and a matrix 104 in the first row extracted from the matrix 102 are contained. Hereinafter, the coding apparatus 33 creates transmission packets 106 to 109 in the same manner by extracting matrices in the second to fifth rows one by one.

Figure 12:
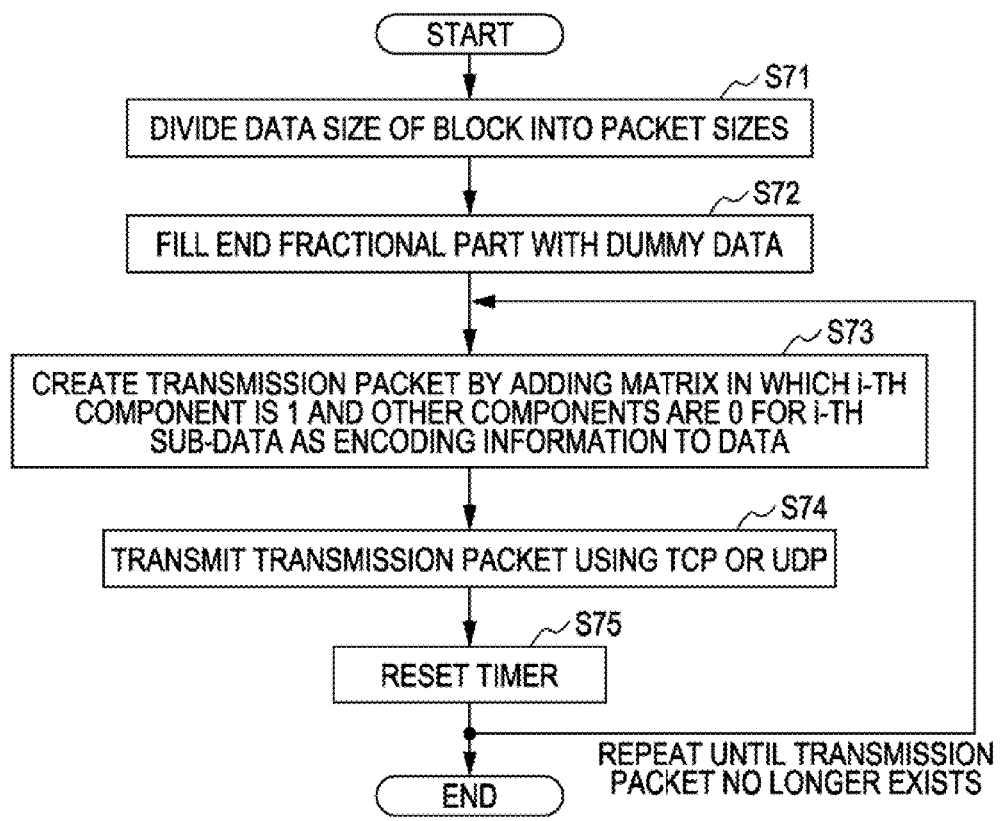
FIG. 12 is a flow chart showing an example of an embodiment of a processing procedure for transmission without encoding.

FIG. 12 is a flow chart showing a processing procedure for transmission without encoding. Processing proceeds to S71 and the coding apparatus 33 divides the data size of a block into the packet sizes. If, for example, the data size of a block is 2001 KB and the packet size is 1000 KB, the coding apparatus 33 divides the block into two pieces of sub-data of 1000 KB and one piece of sub-data of 1 KB.

Processing proceeds to S72 and the coding apparatus 33 fills, among the divided sub-data, the sub-data whose size does not reach the packet size with dummy data in an end fractional part to create sub-data of the packet size. If, for example, the data size of a block is 2001 KB and the packet size is 1000 KB, the coding apparatus 33 adds 999 KB of dummy data to the end of the 1-byte sub-data to create sub-data of the packet size.

Processing proceeds to S73 and the coding apparatus 33 acquires a unit determinant. In a unit determinant, the value of the i-th component is "1" and values of other components are "0".

For the i-th sub-data, the coding apparatus 33 adopts a matrix whose i-th component value is "1" and other component values are "0" as encoding information and adds the encoding information to the i-th sub-data to create a transmission packet as shown in FIG. 10.

Processing proceeds to S74 and the coding apparatus 33 causes the transmitting apparatus 34 to transmit the transmission packet using TCP or UDP. Processing proceeds to S75 and the coding apparatus 33 resets the time 32 before returning to S73. Processing at S73 to S75 is repeated until created transmission packets no longer exist.

Figure 13:
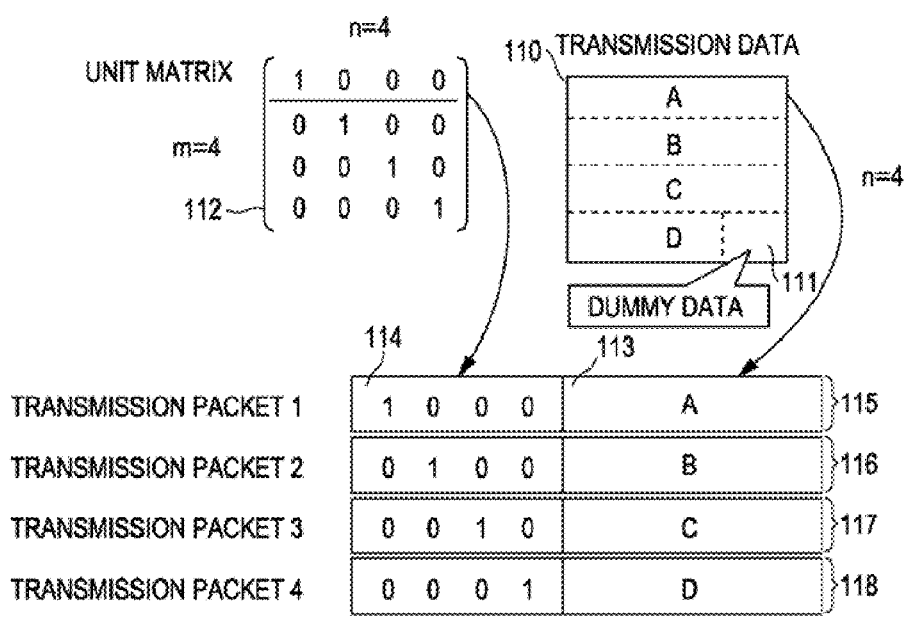
FIG. 13 is an image diagram of an example of an embodiment of processing for transmission without encoding.

Here, transmission processing without encoding shown in FIG. 12 will be described with reference to FIG. 13. FIG. 13 is an image diagram of processing for transmission without encoding. To make the description of FIG. 13 easier, FIG. 13 shows an example in which a block is divided into four pieces of sub-data A to D.

The coding apparatus 33 divides a block 110 into the four pieces of sub-data A to D and fills, among the divided sub-data, the sub-data D whose size does not reach the packet size with dummy data 111 in an end fractional part to create the sub-data A to D of the packet size.

The coding apparatus 33 acquires a unit determinant 112. The coding apparatus 33 extracts the matrix "1000" in the first row from the acquired unit determinant 112. Each component of a row of the unit determinant 112 is associated with the sub-data A to D from the left one by one.

For the first sub-data A, the coding apparatus 33 creates a transmission packet 115 by adopting the matrix "1000" in the first row as encoding information 114 and adding the encoding information 114 to first sub-data 113. Hereinafter, the coding apparatus 33 creates transmission packets 116 to 118 in the same manner by extracting matrices in the second to fourth rows one by one.

Figure 14:
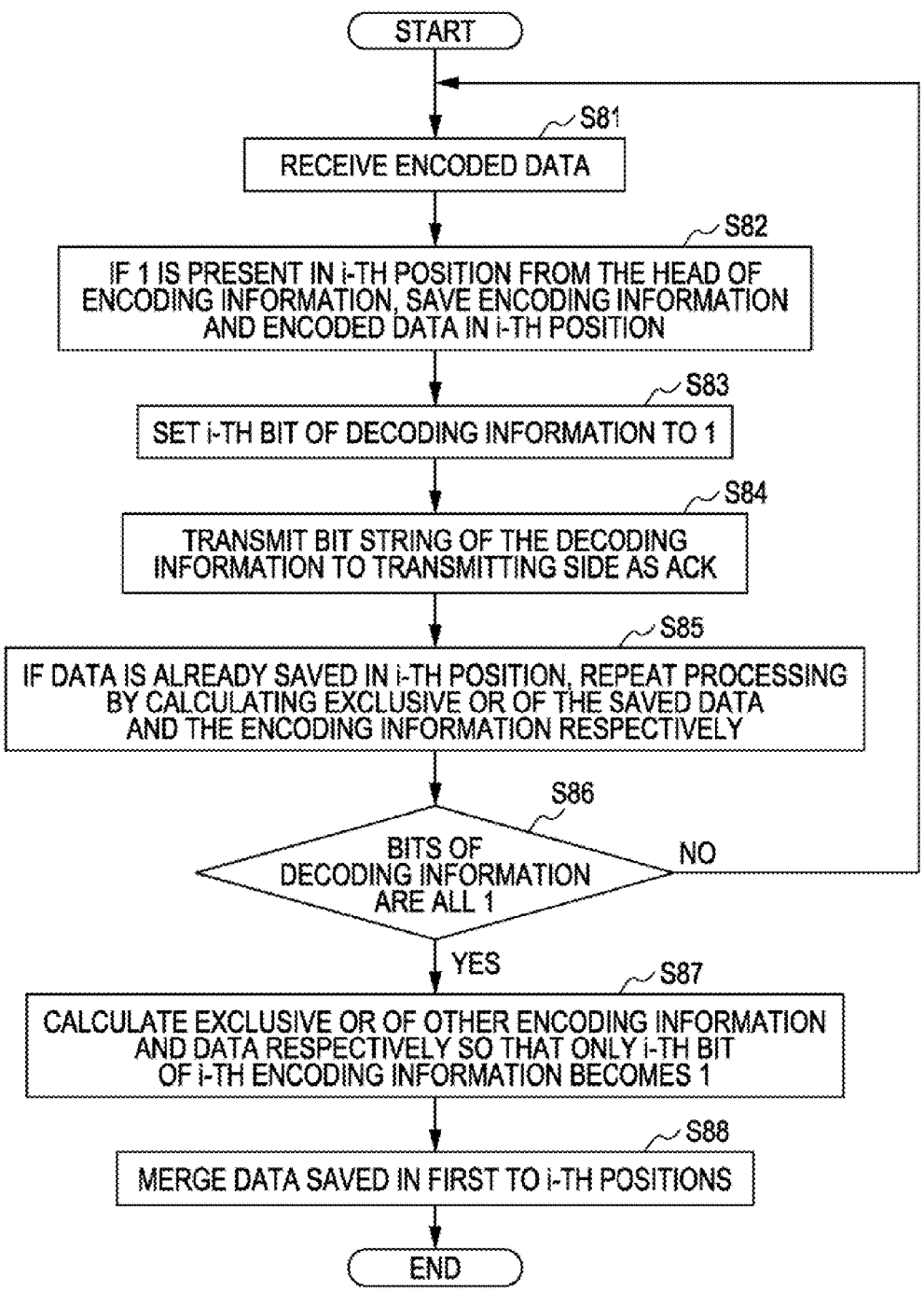
FIG. 14 is a flow chart showing an example of an embodiment of decoding processing of a decoding apparatus.
Figure 15:
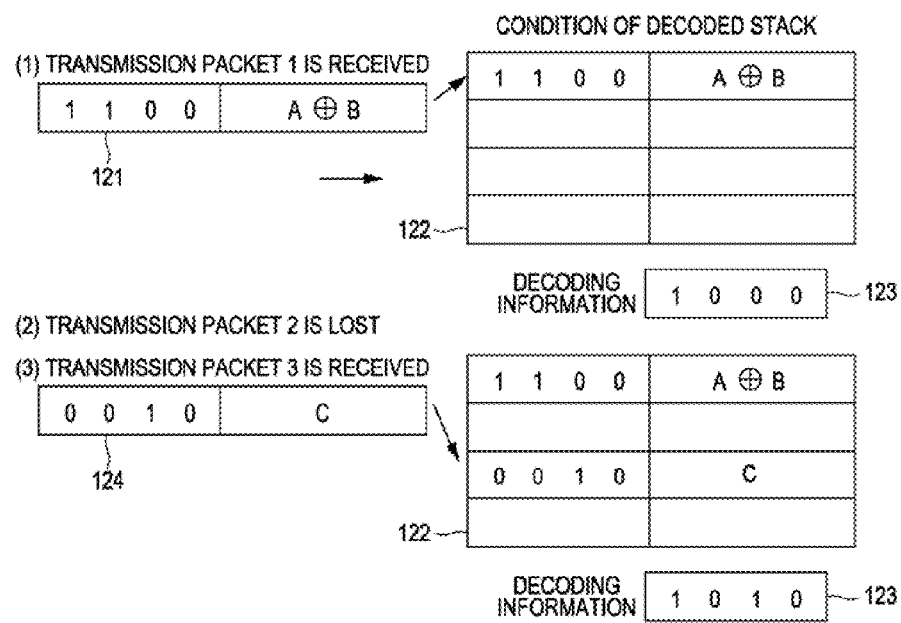
FIG. 15 is an image diagram of an example of an embodiment of decoding processing.
Figure 16:
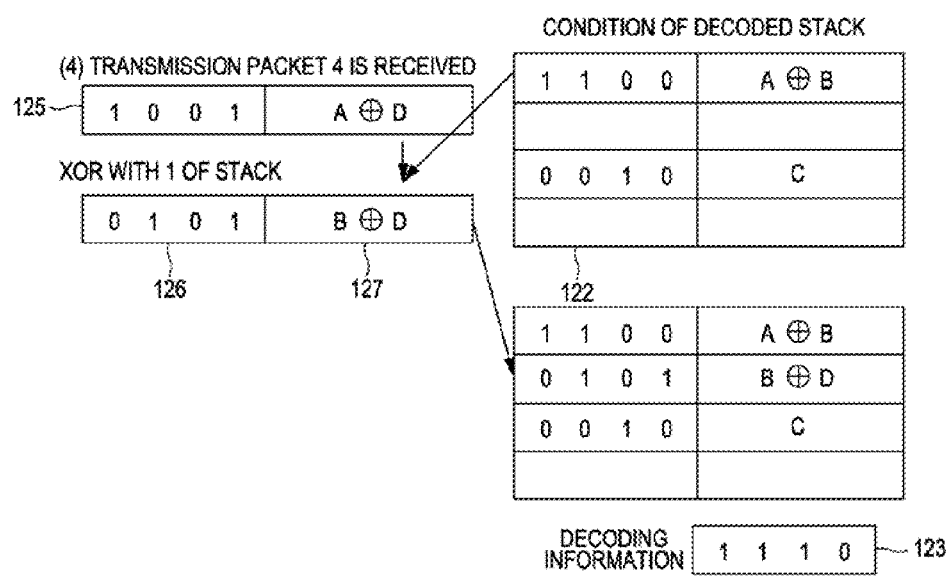
FIG. 16 is an image diagram of an example of an embodiment of decoding processing.
Figure 17:
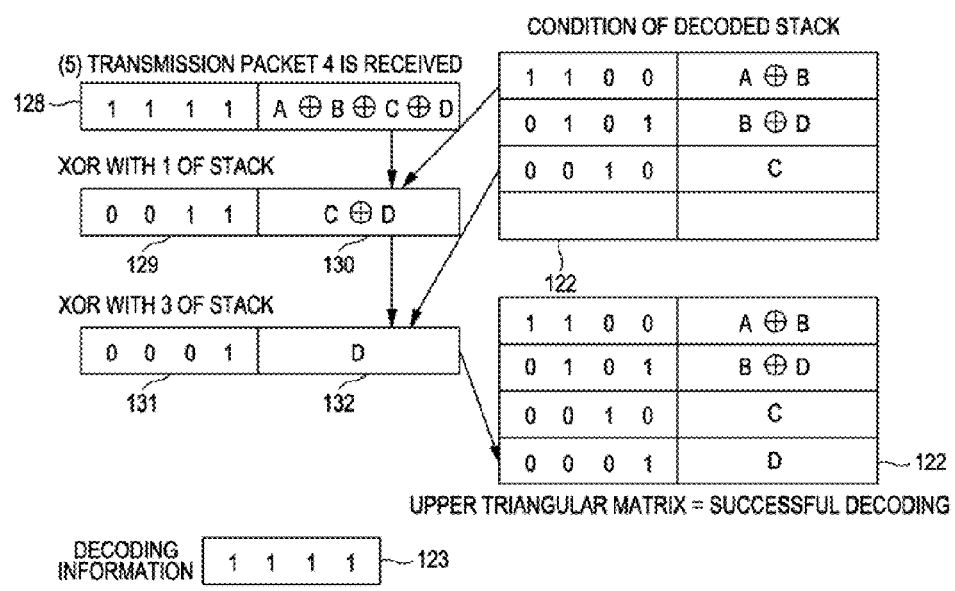
FIG. 17 is an image diagram of an example of an embodiment of decoding processing.

Next, the processing procedure of the data receiving apparatus 40 will be described. The decoding apparatus 43 of the data receiving apparatus 40 receives a transmission packet from the data transfer apparatus 30 via the receiving apparatus 41 to perform decoding processing. FIG. 14 is a flow chart showing decoding processing of a decoding apparatus.

Processing proceeds to S81 and the decoding apparatus 43 receives a transmission packet in FIG. 10 transferred from the data transfer apparatus 30 via the receiving apparatus 41. Processing proceeds to S82 and the decoding apparatus 43 saves, if "1" is present in the i-th position from the head of encoding information included in the transmission packet, the encoding information and encoded data in the i-th position of a decoded stack.

Processing proceeds to S83 and the decoding apparatus 43 sets the i-th bit of decoding information to "1". The decoding information is an i-bit bit string and has "0" as the initial value of the bit string. Processing proceeds to S84 and the decoding apparatus 43 transmits the bit string of decoding information to the data transfer apparatus 30 via the transmitting apparatus 42 as ACK described below.

Processing proceeds to S85 and the decoding apparatus 43 calculates, if encoding information and encoded data are already saved in the i-th position of the decoded stack, exclusive logical sums of the encoding information and encoded data already saved in the i-th position of the decoded stack and encoding information and encoded data of a newly received transmission packet respectively.

If "1" is present in the i-th position from the head of encoding information calculated by exclusive logical sums, the decoding apparatus 43 saves encoding information and encoded data calculated by exclusive logical sums in the i-th position of the decoded stack. If encoding information and encoded data are already saved in the i-th position of the decoded stack, the decoding apparatus 43 calculates exclusive logical sums of the encoding information and encoded data already saved in the i-th position of the decoded stack and encoding information and encoded data calculated by exclusive logical sums respectively. This processing is performed repeatedly.

Processing proceeds to S86 and the decoding apparatus 43 returns to processing at S81 if the bit string of decoding information is not all "1"'s. If the bit string of decoding information is all "1"'s, the decoding apparatus 43 proceeds to S87. At S87, the decoding apparatus 43 calculates exclusive logical sums of the i-th encoding information and encoded data and other encoding information and encoded data respectively so that only the i-th bit of the i-th encoding information becomes "1". That is, the Gaussian elimination is used. Processing proceeds to S88 and data accumulated in the memory 31 may be decoded by merging encoded data saved in the first to i-th position of the decoded stack.

Here, decoding processing shown in FIG. 14 will be described with reference to FIG. 15 to FIG. 18. FIG. 15 to FIG. 18 are image diagrams of decoding processing. In FIG. 15 to FIG. 18, an example in which a coding level n is "4" is shown to make the description easier.

The decoding apparatus 43 receives a transmission packet 121 transferred from the data transfer apparatus 30 via the receiving apparatus 41. The transmission packet 121 includes encoding information "1100". Since "1" is present in the first position from the head of the encoding information "1100", the decoding apparatus 43 saves encoding information and encoded data of the transmission packet 121 in the first position of a decoded stack 122. The decoding apparatus 43 sets the first bit of decoding information 123 to "1".

It is assumed that the transmission packet transferred from the data transfer apparatus 30 subsequent to the transmission packet 121 is lost. The decoding apparatus 43 receives a transmission packet 124 transferred from the data transfer apparatus 30 via the receiving apparatus 41. The transmission packet 121 includes encoding information "0010". Since "1" is present in the third position from the head of the encoding information "1100", the decoding apparatus 43 saves encoding information and encoded data of the transmission packet 124 in the third position of the decoded stack 122. The decoding apparatus 43 sets the third bit of the decoding information 123 to "1".

The decoding apparatus 43 receives a transmission packet 125 transferred from the data transfer apparatus 30 via the receiving apparatus 41. The transmission packet 125 includes encoding information "1001". "1" is present in the first position from the head of the encoding information "1001", but encoding information and encoded data are already saved in the first position of the decoded stack 122 and therefore, the decoding apparatus 43 calculates exclusive logical sums of encoding information and encoded data of the transmission packet 125 and the encoding information and encoded data in the first position of the decoded stack 122 respectively.

The decoding apparatus 43 obtains encoding information 126 and encoded data 127 by calculation of exclusive logical sums. Since "1" is present in the second position from the head of "0101" of the encoding information 126, the decoding apparatus 43 saves the encoding information 126 and the encoded data 127 calculated by exclusive logical sums in the second position of the decoded stack 122. The decoding apparatus 43 sets the second bit of decoding information 123 to "1".

The decoding apparatus 43 receives a transmission packet 128 transferred from the data transfer apparatus 30 via the receiving apparatus 41. The transmission packet 128 includes encoding information "1111". "1" is present in the first position from the head of the encoding information "1111", but encoding information and encoded data are already saved in the first position of the decoded stack 122 and therefore, the decoding apparatus 43 calculates exclusive logical sums of encoding information and encoded data of the transmission packet 128 and the encoding information and encoded data in the first position of the decoded stack 122 respectively.

The decoding apparatus 43 obtains encoding information 129 and encoded data 130 by calculation of exclusive logical sums. "1" is present in the third position from the head of "0011" of the encoding information 129 calculated by exclusive logical sums, but encoding information and encoded data are already saved in the third position of the decoded stack 122 and therefore, the decoding apparatus 43 calculates exclusive logical sums of the encoding information 129 and the encoded data 130 and the encoding information and encoded data already saved in the third position of the decoded stack 122 respectively.

The decoding apparatus 43 obtains encoding information 131 and encoded data 132 by calculation of exclusive logical sums. Since "1" is present in the fourth position from the head of "0001" of the encoding information 131, the decoding apparatus 43 saves the encoding information 131 and the encoded data 132 calculated by exclusive logical sums in the fourth position of the decoded stack 122. The decoding apparatus 43 sets the fourth bit of decoding information 123 to "1". The decoded stack 122 shown in the lower part of FIG. 17 has an upper triangular matrix of saved encoding information, which indicates successful decoding.

Since the decoding information 123 now has a bit string of all "1"'s, the decoding apparatus 43 calculates exclusive logical sums in such a way that only the first bit of the first encoding information of the decoded stack 122, the second bit of the second encoding information, the third bit of the third encoding information, and the fourth bit of the fourth encoding information have "1".

In the example in FIG. 18, for example, the second encoding information becomes "0100" by calculating an exclusive logical sum of the second and fourth of the decoded stack 122. Also in the example in FIG. 18, for example, the first encoding information becomes "1000" by calculating an exclusive logical sum of the second and fourth of the decoded stack 122 and then calculating an exclusive logical sum of the first and second of the decoded stack 122.

The decoding apparatus 43 may decode data accumulated in the memory 31 of the data transfer apparatus 30 by merging the decoded data A to D saved in the first to fourth positions of the decoded stack 122 shown in the lower part of FIG. 18.

Figure 19:
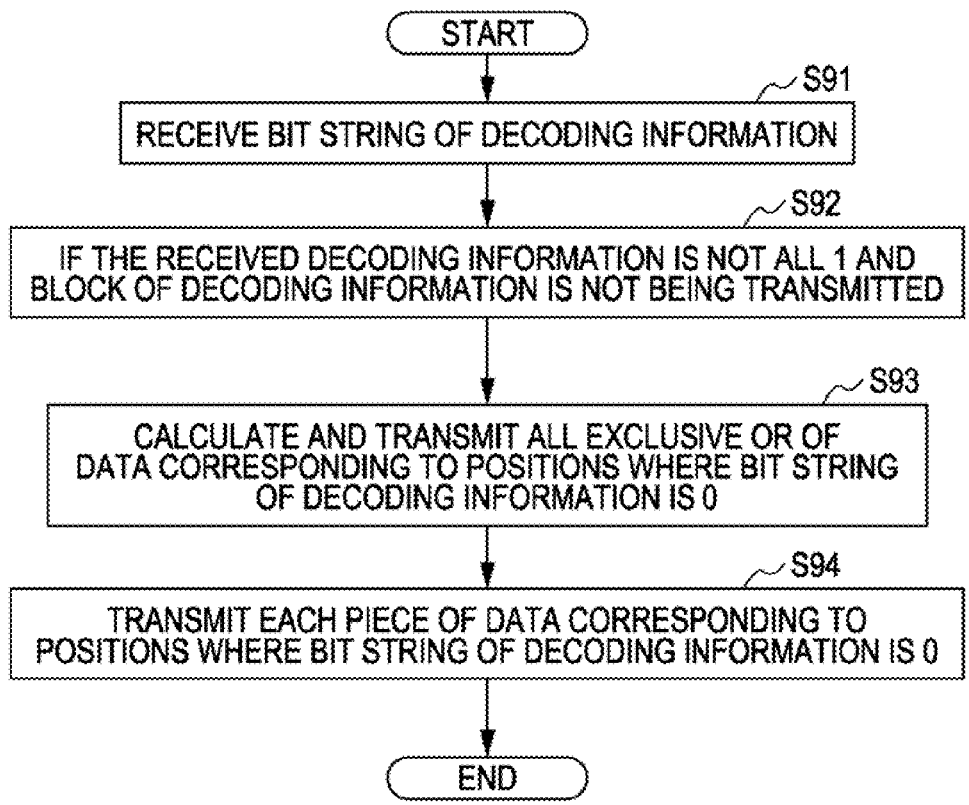
FIG. 19 is a flow chart showing an example of an embodiment of a processing procedure for ACK of an encoding apparatus.
Figure 20:
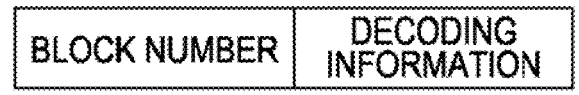
FIG. 20 is a schematic diagram of an example of an embodiment of an ACK.

FIG. 19 is a flow chart showing a processing procedure for ACK of an encoding apparatus. Processing proceeds to S91 and the coding apparatus 33 receives ACK as shown in FIG. 20 from the data receiving apparatus 40 via the receiving apparatus 35. FIG. 20 is a schematic diagram of an ACK. The ACK shown in FIG. 20 is configured to have the block number and decoding information.

The coding apparatus 33 acquires a bit string of decoding information from the received ACK. Processing proceeds to S92 and if any "0" bit is included in the acquired bit string and a transmission packet corresponding to the decoding information is not being transmitted, the coding apparatus 33 proceeds to S93. The coding apparatus 33 calculates exclusive logical sums of all sub-data corresponding to "0" bits of bits in the bit string of encoding information and transmits the exclusive logical sums as a transmission packet. Processing proceeds to S94 and the coding apparatus 33 transmits each piece of sub-data corresponding to each "0" bit of bits in the bit string of encoding information.

In data transfer of the ASP system 1 in an IP network, a delay caused by accumulation is reduced by sequentially accumulating data to be transferred in the memory 31 and preparing several levels of the data amount used for encoding. When data is accumulated up to a level of a first specified and/or maximum data amount, data is substantially immediately encoded and transmitted. When data is not yet input up to a level of the first specified and/or the maximum data amount, data is encoded at this stage and then transmitted if a specified amount of time passes. If data is not input up to a second specified and/or minimum level, the data is transferred by a method using TCP or UDP without being encoded.

For encoding of accumulated data, the accumulated data is divided into n pieces of data determined for each level of encoding and exclusive logical sums of n pieces of data are calculated to create (n×m) pieces of encoded data. At this point, a combination method of data may be prepared as an (n×m) matrix and thus, several such matrices with good behavior with respect to extinction may be determined in advance. For example, eight matrices of n=8, 16, 32, 64, 128, 256, 512, and 1024 are provided. If the packet size is 1000 bytes, blocks of data of data sizes of at least 8000, 16000, 32000, 64000, 128000, 256000, and 1024000 are used. In the past, if the data size does not reach any of the above data sizes, a remaining portion is filled with dummy data for encoding, resulting in less efficiency due to an increasing data amount to be transmitted.

Thus, efficiency is increased by a method by which the data size of accumulated data is sequentially applied to encoding in descending order of block size and if the data size does not reach any of the above data sizes, encoding is not performed. If, for example, the data size of accumulated data is 1234567 bytes, the first 1024000 bytes are encoded and transmitted by a matrix of n=1024. Next, the first 128000 bytes of the remaining 210567 bytes are encoded and transmitted by a matrix of n=128. Similarly, first 64000 bytes of the remaining 82567 bytes are encoded by n=64 and 16000 bytes are encoded by n=16 for transmission. 2567 bytes remaining in the end are transmitted without being encoded.

A row of a matrix representing a data combination is converted into a bit string and transmitted together when data is transferred. It is also possible to create only m pieces of encoded data from the original n pieces of data without calculating n exclusive logical sums and a delay may further be reduced because n pieces of data may be transferred before being encoded. However, when m is a small number, behavior with respect to extinction may become degraded. When data is not encoded, the position of the divided data is added to the header before the data is transferred.

The data receiving apparatus 40 on the receiving side attempts to decode the received encoded data and sends a decoding condition. The data transfer apparatus 30 on the transmitting side that receives the decoding condition determines that retransmission of data that has not been decoded by the data receiving apparatus 40 is used if the data transfer apparatus 30 on the transmitting side has not yet transmitted the data and retransmits data that has not been decoded. In this case, instead of transmitting all (n+m) pieces of data, only a portion of data that has not been decoded based on the received decoding condition.

According to an example of an embodiment, when compared with a conventional data transfer method using TCP, the transfer rate may be increased while the real-time nature is ensured when RTT is large. Also, according to an example of an embodiment, by using different encoding matrices, a processing system that transmits data after encoding the data and a processing system that transmits data without encoding the data may be configured in the same manner so that processing systems for decoding data may also be configured in the same manner.

As modifications of an example of an embodiment, for example, the data transfer apparatus 30 may be a computer controlled based on execution of a data transfer program, or a dedicated device, a semiconductor chip, or a PC card.

Data to be transferred may be, in addition to screen data, any data from which high real-time nature is demanded and whose amount that comes out changes over time such as image data and sound data of a monitoring camera, for example.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of example of embodiments of the invention. Although example of embodiments of the present invention have been described in detail, it should be understood that the various changes, substitutions, and alterations could be made hereto without departing from the spirit and scope of this disclosure.

What is claimed is:

1. A data transfer apparatus comprising:
a data accumulation unit to accumulate data to be transferred;
an encoding matrix storage unit to store a plurality of encoding matrices including an encoding matrix for encoding data of each of a plurality of data sizes;
an encoding size determination unit to determine a block in descending order of data size based on the data sizes of the data to be transferred in the data accumulation unit;
an encoding unit to acquire an encoding matrix corresponding to the data size of the determined block from the encoding size determination unit and encode data accumulated in the data accumulation unit for each block using the acquired encoding matrix;
a packet generation unit to generate a packet by adding encoding information about the encoding matrix used for encoding the encoded data; and
a transmission unit to transmit the generated packet;
wherein the encoding size determination unit compares reduced data sizes reduced by a ratio of the data sizes of the blocks and the data size of data accumulated in the data accumulation unit to determine the block of the largest data size among the blocks whose reduced data size is smaller than the data size of the data accumulated in the data accumulation unit; and
wherein the encoding unit acquires the encoding matrix of the determined block, acquires the data for the reduced data size of the determined block from the data accumulation unit, adds dummy data to the data acquired from the data accumulation unit, and encodes the data acquired from the data accumulation unit and to which the dummy data is added using the acquired encoding matrix.

2. The data transfer apparatus according to claim 1, wherein the encoding size determination unit determines, from among the blocks whose data size is smaller than that of data accumulated in the data accumulation unit, the block having the largest data size, and the encoding unit acquires the encoding matrix corresponding to the determined block, acquires the data for the data size of the determined block from the data accumulation unit, and encodes the data acquired from the data accumulation unit using the acquired encoding matrix.

3. The data transfer apparatus according to claim 1, wherein the reduced data sizes are obtained by multiplying a ratio with the data sizes of the blocks.

4. The data transfer apparatus according to claim 1, further comprising:
a timer unit to track an amount of non-transmission time, the non-transmission time being an amount of time in which a packet is not continuously transmitted; and an encoding size determination instruction unit to cause the encoding size determination unit to determine the data size of the block when the data size of data accumulated in the data accumulation unit becomes larger than a smallest data size among the data sizes of the blocks or the non-transmission time becomes equal to or larger than a specified time.

5. The data transfer apparatus according to claim 4, wherein the encoding size determination unit determines a block of data accumulated in the data accumulation unit is not to be encoded when the data size of the data accumulated in the data accumulation unit is not larger than the smallest data size among the data sizes of the blocks and the non-transmission time is equal to or larger than the specified time, and
the packet generation unit acquires a unit matrix as the encoding matrix of the block not to be encoded and generates a packet by adding information about the unit matrix as the encoding matrix to the data accumulated in the data accumulation unit.

6. A data transfer method for transferring data including data having a plurality of different data sizes, the data transfer method comprising:
accumulating data to be transferred in a data accumulation unit;
determining a block in descending order of data size based on data sizes of the data to be transferred in the data accumulation unit;
acquiring an encoding matrix corresponding to the data size of the determined block;
encoding data accumulated in the data accumulation unit for each block using the acquired encoding matrix;
generating a packet by adding encoding information about the encoding matrix used for encoding the encoded data; and
transmitting the generated packet;
wherein the determining compares reduced data sizes of the blocks and the data size of data accumulated in the data accumulation unit to determine the block of a largest data size among the blocks whose reduced data size is smaller than the data size of the data accumulated in the data accumulation unit, and
wherein the encoding acquires the data for the reduced data size of the determined block from the data accumulation unit, adds dummy data to the data acquired from the data accumulation unit, and encodes the data to which the dummy data is added using the acquired encoding matrix.

7. The data transfer method according to claim 6, wherein a plurality of encoding matrices are stored in an encoding matrix storage unit.

8. The data transfer method according to claim 6, wherein the determining determines, among the blocks whose data size is smaller than that of the data accumulated in the data accumulation unit, the block having a largest data size, and the encoding acquires the data for the data size of the determined block from the data accumulation unit, and encodes the data acquired from the data accumulation unit using the acquired encoding matrix.

9. The data transfer method according to claim 6, wherein the reduced data sizes are obtained by multiplying a ratio with the data sizes of the blocks.

10. The data transfer method according to claim 6, further comprising:
tracking an amount of non-transmission time, the non-transmission time being an amount of time in which a packet is not continuously transmitted; and
determining the data size of the block when the data size of data accumulated in the data accumulation unit becomes larger than a smallest data size among the data sizes of the blocks or the tracked non-transmission time becomes equal to or larger than a specified time.

11. The data transfer method according to claim 10, wherein the determining determines a block of data accumulated in the data accumulation unit to not encode when the data size of the data accumulated in the data accumulation unit is not larger than the smallest data size among the data sizes of the blocks and the non-transmission time is equal to or larger than the specified time, the acquiring acquires a unit matrix as the encoding matrix of the block not to be encoded, and the generating generates a packet by adding information about the unit matrix as the encoding matrix to the data accumulated in the data accumulation unit.

12. A computer-readable, non-transitory medium storing a data transfer program that causes a computer to perform a method, the method comprising:
- accumulating data to be transferred in a data accumulation unit;
- determining a block in descending order of data size based on data sizes of the data to be transferred in the data accumulation unit;
    - acquiring an encoding matrix corresponding to the data size of the determined block;
    - encoding data accumulated in the data accumulation unit for each block using the acquired encoding matrix;
    - generating a packet by adding encoding information about the encoding matrix used for encoding the encoded data; and transmitting the generated packet, wherein the determining compares reduced data sizes the blocks and the data size of data accumulated in the data accumulation unit to determine the block of a largest data size among the blocks whose reduced data size is smaller than the data size of the data accumulated in the data accumulation unit, and
- wherein the encoding acquires the data for the reduced data size of the determined block from the data accumulation unit, adds dummy data to the data acquired from the data accumulation unit, and encodes the data to which the dummy data is added using the acquired encoding matrix.

13. The computer-readable, non-transitory medium according to claim 12, wherein a plurality of encoding matrices are stored in an encoding matrix storage unit.

14. The computer-readable, non-transitory medium according to claim 12, wherein the determining determines, among the blocks whose data size is smaller than that of the data accumulated in the data accumulation unit, the block having a largest data size, and the encoding acquires the data for the data size of the determined block from the data accumulation unit, and encodes the data acquired from the data accumulation unit using the acquired encoding matrix.

15. The computer-readable, non-transitory medium according to claim 12, wherein the reduced data sizes are obtained by multiplying a ratio with the data sizes of the blocks.

16. The computer-readable, non-transitory medium according to claim 12, further comprising:
- tracking an amount of non-transmission time, the non-transmission time being an amount of time in which a packet is not continuously transmitted; and determining the data size of the block when the data size of data accumulated in the data accumulation unit becomes larger than a smallest data size among the data sizes of the blocks or the tracked non-transmission time becomes equal to or larger than a specified time.

17. The computer-readable, non-transitory medium according to claim 16, wherein the determining determines a block of data accumulated in the data accumulation unit to not encode when the data size of the data accumulated in the data accumulation unit is not larger than the smallest data size among the data sizes of the blocks and the tracked non-transmission time becomes equal to or larger than a specified time, the acquiring acquires a unit matrix as the encoding matrix of the block not to be encoded, and the generating generates a packet by adding information about the unit matrix as the encoding matrix to the data accumulated in the data accumulation unit.

* * * * *